United States Patent [19]

Ogiwara

[11] Patent Number: 5,729,208
[45] Date of Patent: Mar. 17, 1998

[54] APPARATUS FOR DETECTING OPEN CIRCUIT IN HARD DISK DRIVE

[75] Inventor: Hisao Ogiwara, Plano, Tex.

[73] Assignee: Texas Instruments Incorporated, Dallas, Tex.

[21] Appl. No.: 724,749

[22] Filed: Oct. 2, 1996

Related U.S. Application Data

[60] Provisional application No. 60/004,708 Oct. 3, 1995.

[51] Int. Cl.[6] .................................................. G08B 21/00
[52] U.S. Cl. .......................... 340/635; 340/652; 360/46; 360/68
[58] Field of Search ............................. 340/635, 652; 360/47, 67, 46, 68

[56] References Cited

U.S. PATENT DOCUMENTS 4,940,969 7/1990 Taylor ........................................ 340/635
5,434,717 7/1995 Yoshinaga et al. .......................... 360/46

Primary Examiner—Jeffery Hofsass
Assistant Examiner—Julie B. Lieu
Attorney, Agent, or Firm—Bret J. Petersen; W. James Brady, III; Richard L. Donaldson

[57] ABSTRACT

The open condition detection circuit (10) detects breakage in an external write magnetic coil (16, 18) in a hard disk drive. The magnetic coil (16, 18) receives write head signals $H_X$ and $H_Y$ generated by a write driver (12, 14) in response to write data $D_X$ and $D_Y$. The circuit (10) includes a comparator (26, 28) coupled to the write driver (12, 14) for comparing both the write head signals $H_X$ and $H_Y$ with a predetermined reference voltage level and generating first and second differential comparison output signals. A first latch (40, 150) is coupled to the comparator (26, 28) and uses the write data $D_X$ and $D_Y$ as clock signals for latching the first differential comparison output signal just prior to a predetermined polarity change in the write head signal $H_X$. A second latch (42, 154) is also coupled to the comparator (26, 28) and is clocked by the write data $D_X$ and $D_Y$ for latching the second differential comparison output signal just prior to a predetermined polarity change in the write head signal $H_Y$. A multiplexer (44) coupled to the first and second latches alternatively selects an output from one of the first and second latches in response to the write data $D_X$ and $D_Y$. The multiplexer (44) generates an output indicative of an open circuit condition in the external write magnetic coil (16, 18).

13 Claims, 4 Drawing Sheets

5,729,208

APPARATUS FOR DETECTING OPEN CIRCUIT IN HARD DISK DRIVE

This application claims priority under 35 USC § 119(e)(1) of provisional application number 60/004,708 filed Oct. 3, 1995.

TECHNICAL FIELD OF THE INVENTION

This invention is related in general to the field of integrated circuits. More particularly, the invention is related to apparatus for detecting open circuit in a hard disk drive.

BACKGROUND OF THE INVENTION

In a hard disk drive for a computer memory system, it is important to detect certain fault conditions that disrupt system operations. For example, when write data are driven off-chip to the external write magnetic head coils, there is the possibility that breakage may occur at the point the coil wires are connected to the integrated circuit, in the wires, or in the coil. The breakage causes an open circuit condition that renders the system inoperable, since the data cannot be accurately written onto the hard disk. Therefore, it is important to be able to detect this condition so that the computer system and the user may be alerted.

Conventional circuits and methods for detecting the open circuit condition attempt to integrate the area under the write data waveform and compares the result to a predetermined threshold value. When an open circuit condition exists, the integrated area of the write data waveform departs substantially from the predetermined threshold value to indicate a fault. However, this method suffers from a number of problems. At high data writing frequencies, the write data waveforms become much narrower, so that the area integration process may be difficult. The resulting comparisons with the threshold value may be inconclusive and the open circuit condition not detected. Furthermore, if the external write coil value has been changed, the corresponding area under the write data waveform is also changed, thus requiring the comparison threshold value to be modified accordingly. Changes in circuit parameters caused by temperature variations can also similarly affect the comparison process and produce inaccurate results.

SUMMARY OF THE INVENTION

Accordingly, there is a need for a hard disk drive open circuit detection circuit and method therefor that operate successfully even with high disk writing frequency, and is not adversely affected by changing external coil values and temperature variations.

In accordance with the present invention, an open circuit detection circuit and method are provided which eliminates or substantially reduces the disadvantages associated with prior circuits and methods.

In one aspect of the invention, the open condition detection circuit detects breakage in an external write magnetic coil in a hard disk drive. The hard disk drive includes a magnetic coil which receives write head signals $H_X$ and $H_Y$ generated by a write driver in response to receiving write data $D_X$ and $D_Y$. The circuit includes a comparator coupled to the write driver for comparing both write head signals $H_X$ and $H_Y$ with a predetermined reference voltage level and generating first and second differential comparison output signals. A first latch is coupled to the comparator and uses the write data $D_X$ and $D_Y$ as clock signals for latching the first differential comparison output signal just prior to a predetermined polarity change in the write head signal $H_X$. A second latch is also coupled to the comparator and is clocked by the write data $D_X$ and $D_Y$ for latching the second differential comparison output signal just prior to a predetermined polarity change in the write head signal $H_Y$. A multiplexer coupled to the first and second latches alternatively selects an output from one of the first and second latches in response to the write data $D_X$ and $D_Y$. The multiplexer generates an output indicative of an open circuit condition in the external write magnetic coil.

In another aspect of the invention, a method for detecting an open circuit condition in an external write magnetic coil of a hard disk drive is disclosed. The hard disk drive has a write driver per channel which receives write data $D_X$ and $D_Y$ and generates write head signals $H_X$ and $H_Y$ supplied to the coil. The write head signals $H_X$ and $H_Y$ are first compared with a predetermined reference voltage level and a first and second comparison output are generated in response to the comparisons. A logic state of the first comparison output is captured just prior to a predetermined polarity change in the $H_X$ write head signal, and a logic state of the second comparison output is also just captured just prior to a predetermined polarity change in the $H_Y$ write head signal. An output signal is then generated from the captured logic states of the first and second comparison outputs indicative of an open circuit condition.

A technical advantage of the current open circuit detection circuit and method is the ability to accurately detect the faulty condition with high write frequency. External write magnetic coil value changes do not require adjustments in the circuit or the algorithm. Temperature variations also do not adversely affect the detection of the open circuit condition.

BRIEF DESCRIPTION OF THE DRAWINGS

For a better understanding of the present invention, reference may be made to the accompanying drawings, in which.

DETAILED DESCRIPTION OF THE INVENTION

Figure 1:
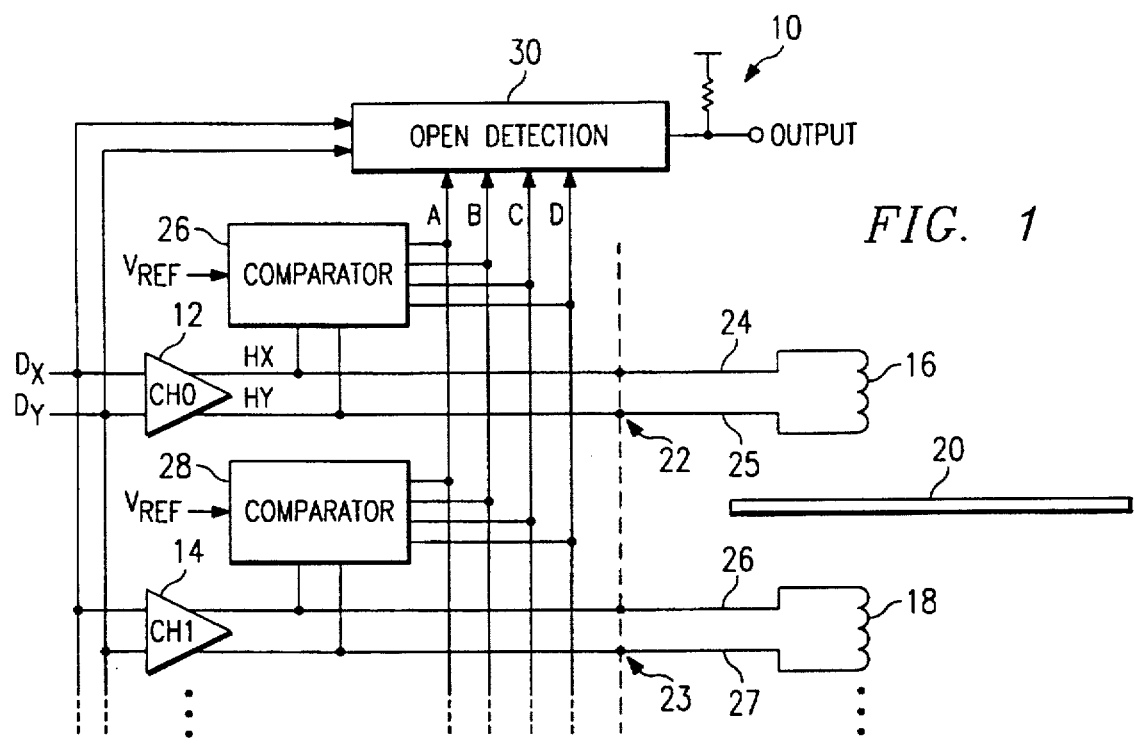
FIG. 1 is a simplified block diagram of the apparatus for detecting open circuit in a hard disk write driver constructed according to the teachings of the present invention.

The preferred embodiments of the present invention are illustrated in FIGS. 1–6, like reference numerals being used to refer to like and corresponding parts of the various drawings.

Figure 2:
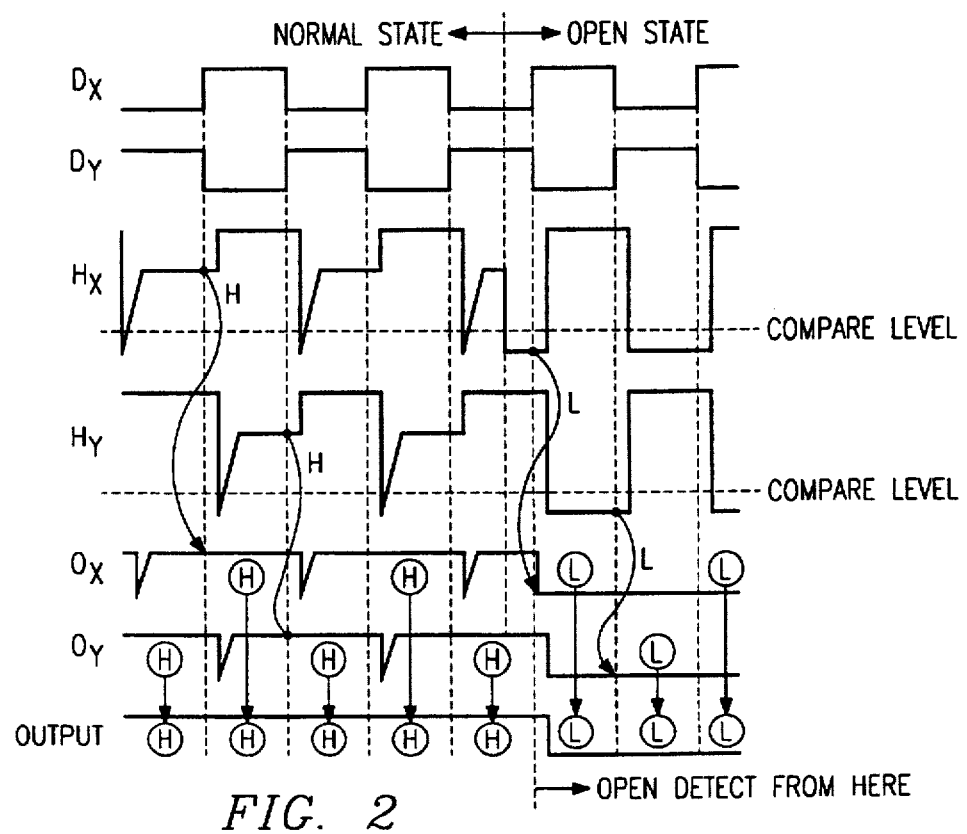
FIG. 2 is a timing diagram of signals relevant to the discussion of operations of the apparatus.

Referring to FIG. 1, apparatus 10 for detecting open circuit in a hard disk write driver is shown. Write data, $D_X$ and $D_Y$, are provided to multiple channels of write drivers (two are shown) 12 and 14. Write drivers 12 and 14 generates write head signals, $H_X$ and $H_Y$, which correspond to $D_X$ and $D_Y$, respectively, and indicate which signal is high (or logic "1") and which signal is low (or logic "0"). FIG. 2 shows an exemplary timing diagram of the signals. The write driver output signals, $H_X$ and $H_Y$, are provided off-chip to magnetic head coils 16 and 18, which generate electromagnetic fields to write the data to a hard disk 20.

An open circuit may be caused by three conditions:
1) damage to the soldering points 22 and 23 that wires 22-25 are connected to the integrated circuit the write drivers 12 and 14 reside on;
2) breakage in wires 22-25 leading to coils 16 and 18; and
3) damage or breakage in coils 16 and 18.

To detect an open circuit, a comparator circuit 26 and 28 is provided per channel, which compares write driver output signals, $H_X$ and $H_Y$, to a predetermined reference voltage level, $V_{REF}$. Comparator circuits 26 and 28 generate outputs labeled A, B, C, and D in response to the comparison, which are provided to an open detection circuit 30. Open detection circuit 30 then generates an output signal indicative of whether an open circuit condition has been detected.

Figure 3:
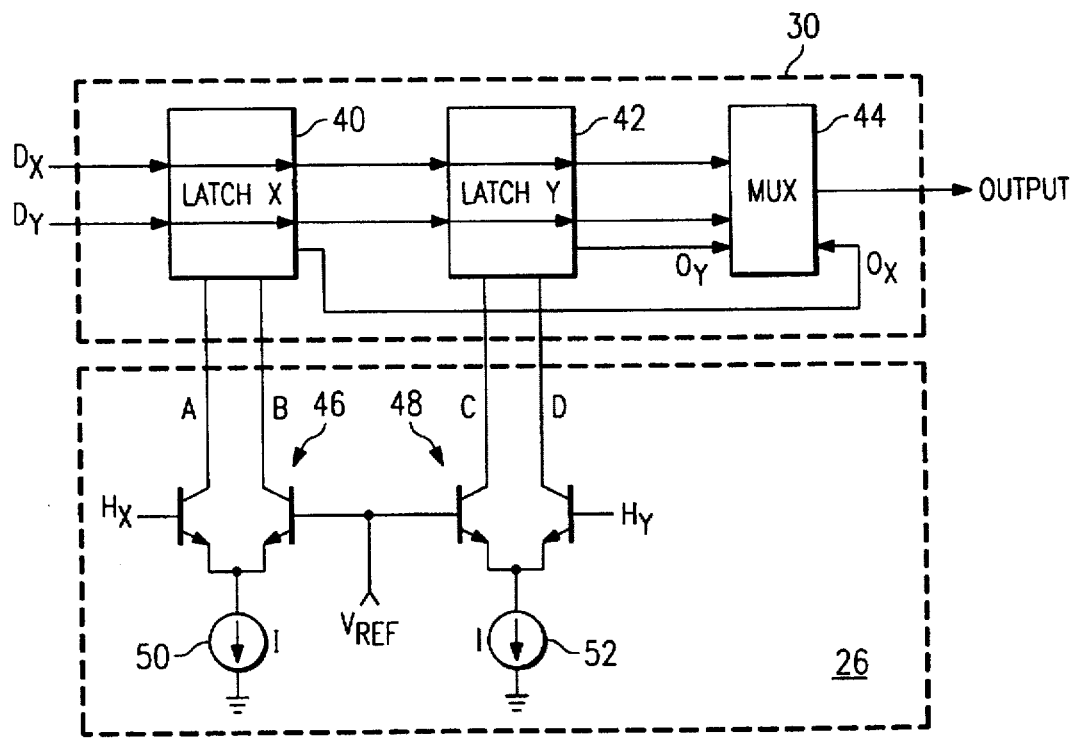
FIG. 3 is a simplified block diagram of an open detecting latch circuit and comparator circuit.

Referring to FIG. 3, additional details of comparator circuit 26 and open detection circuit 30 are shown. Open detection circuit 30 includes a first latch 40 which receives write data $D_X$ as a clock signal for receiving and latching data A and B from comparator circuits 26 and 28 of all the channels (only one shown). Open detection circuit 30 further includes a second latch 42 which uses write data $D_Y$ as a clock signal to receive and latch data C and D produced by comparator circuits 26 and 28 of all the channels. The outputs, $O_X$ and $O_Y$, from latches 40 and 42 are then provided to the input of a multiplexer (MUX) 44, which selects one of the latch outputs $O_X$ and $O_Y$ as the open circuit condition detection output.

Comparator circuit 26 for a channel compares the write head signals $H_X$ and $H_Y$ to a reference voltage level, $V_{REF}$. Comparator circuit 26 includes a first differential pair 46 receiving differential inputs $H_X$ and $V_{REF}$, and a second differential pair 48 receiving differential inputs $H_Y$ and $V_{REF}$. Differential pairs 46 and 48 are constructed from matched transistors whose emitters are joined together and biased by constant current sources I 50 and 52, respectively. The collectors of the transistors in differential pairs 46 and 48 provide signals A, B, C, and D. Signals A, B, C, and D are provided to latch X 40 and latch Y 42 of open detector circuit 30.

Figure 4:
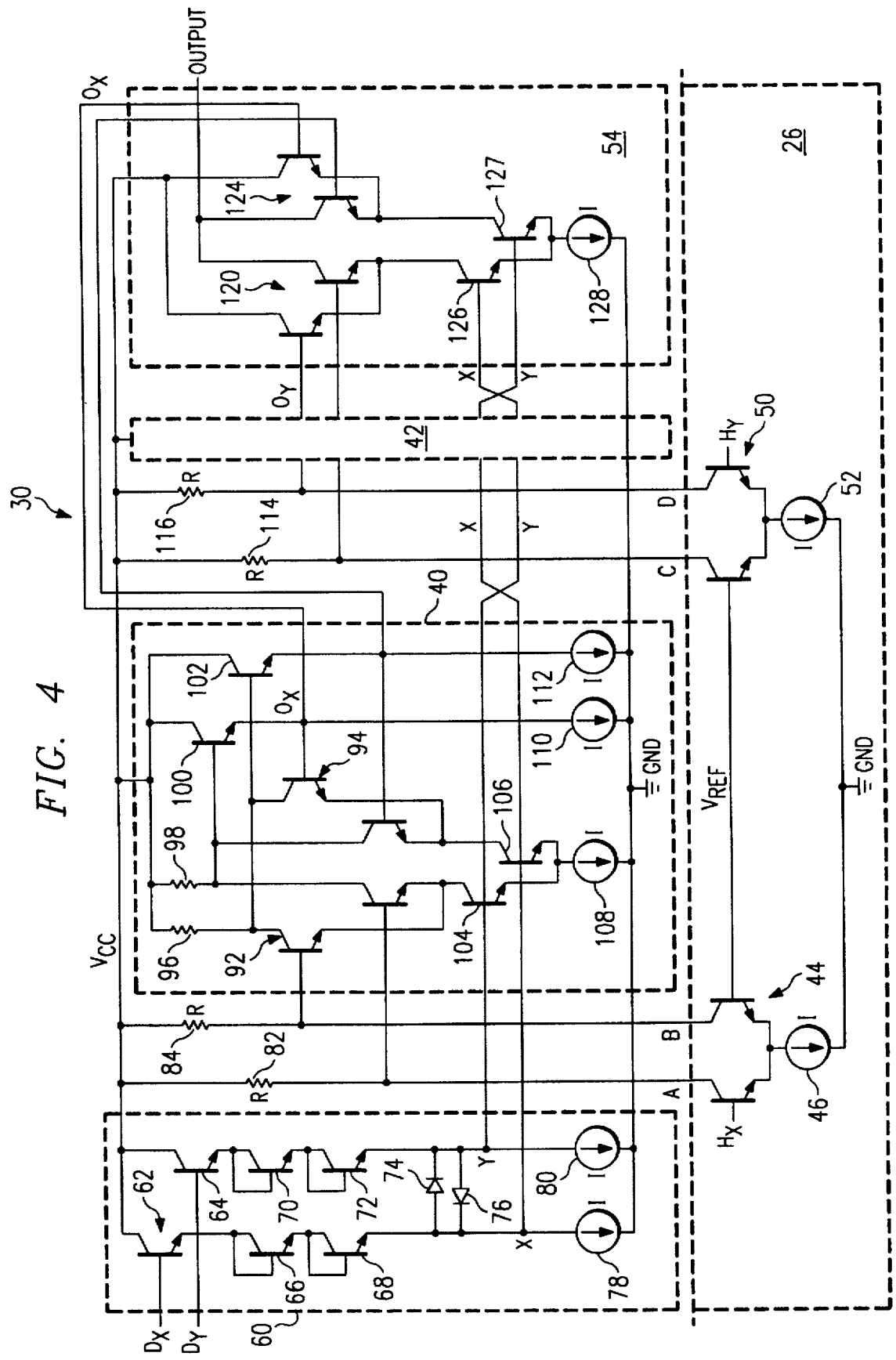
FIG. 4 is a schematic diagram of an embodiment of the open detecting latch circuit constructed in accordance with the teachings of the present invention.

Referring to FIG. 4, open detector circuit 30 is shown in more detail. Open detector circuit 30 includes a first stage conversion circuit 60 for converting write data $D_X$ and $D_Y$ from full swing CMOS (complementary metal oxide semiconductor) voltage levels to ECL (emitter-coupled logic) levels. Open detector circuit 30 is shown in ECL to take advantage of its speed. However, other logic circuit families may also be used if speed is not a primary consideration. Conversion circuit 60 includes a first transistor 62 receiving write data $D_X$ at its base, and a second transistor 64 receiving write data $D_Y$ at its base. The emitter of transistor 62 is coupled to two diode-connected transistors 66 and 68 coupled in series. The emitter of transistor 64 is also coupled to two diode-connected transistors 70 and 72 coupled in series. Two diodes 74 and 76 are then coupled in parallel across the emitters of transistors 68 and 72, where the p-junction of diode 74 is coupled to transistor 68 and the p-junction of diode 76 is coupled to transistor 72. Two constant current sources 78 and 80 of equal magnitude, I, are coupled to diode-connected transistors 68 and 72, respectively. Two ECL level clock signals, X and Y, are thus generated from CMOS level write data $D_X$ and $D_Y$, which are provided to latches 40 and 42 for latching differential signals A, B, C, and D.

The collectors of the transistors in differential pair 44 of comparator circuit 26 are each coupled to a resistor 82 and 84, respectively, and to $V_{CC}$. Latch 40 includes a differential pair 92 receiving signals A and B as differential input, and having resistors 96 and 98 coupled to each of the collectors of the transistors in differential pair 92. The emitters of differential pair 92 are coupled to the collector of a transistor 104, which is further coupled to a current source 108 and to ground. The base of transistor 104 receives the clock signal Y from conversion circuit 60. Latch 40 includes a second differential pair 94 with its collectors also coupled to resistors 96 and 98. The emitters of differential pair 94 are coupled to the collector of a transistor 106, which is also coupled to current source 108. The base of transistor 106 receives the X clock signal from conversion circuit 60 for latching A and B signals.

Latch 40 further includes transistors 100 and 102 receiving the differential output from differential pair 92. The base of transistors 100 and 102 are coupled to the collectors of the transistors in differential pair 92. The emitters of transistors 100 and 102 are coupled to the bases of the transistors in differential pair 94, and to ground through constant current sources 110 and 112, respectively. The emitters of transistors 100 and 102 provide differential output signals designated as $O_X$, which are provided to multiplexer 54.

Signals C and D are generated on the collectors of transistor differential pair 50 in comparator circuit 26, which are coupled through resistors 114 and 116 to $V_{CC}$ and provided to latch 42 as differential input. Differential output signals, $O_Y$, are generated. Because latch 42 may be constructed in substantially the same manner as latch 40, details of latch 42 are not shown to promote clarity and simplicity in the drawing figure. Note that clock signals X and Y are switched for latch 42. It may be noted that although latches 40 an 42 are shown in specific detail herein, other implementations therefor are also contemplated.

Differential outputs $O_X$ and $O_Y$ are generated from latches 40 and 42, respectively, and provided to multiplexer 54. Multiplexer 54 includes a first and second differential pairs 120 and 124, which receive $O_X$ and $O_Y$, respectively. The emitters of the transistors in differential pair 120 are coupled to the collector of a transistor 126, which is differentially coupled to another transistor 127, which is coupled to differential pair 124. A constant current source 128 coupled to ground is coupled to the emitters of transistors 126 and 127. Multiplexer 54 provides one of $O_X$ and $O_Y$ as the output depending on clock signals X and Y.

The timing diagram shown in FIG. 2 illustrates the operations of circuit 10. Write data $D_X$ and $D_Y$ are logical opposites of one another, where one is high and the other low, and vice versa. $D_X$ and $D_Y$ are converted to ECL levels by conversion circuit 60 into clock signals X and Y to be used to clock the latch and multiplexer circuits 40, 42, and 54. Write drivers 12 and 14 then generate signals $H_X$ and $H_Y$ from the write data, exemplary waveforms of which are shown in FIG. 2. Comparator circuit 26 compares signals $H_X$ and $H_Y$ with a reference voltage or compare level and generates differential output signals, signals A, B, C, and D. The reference voltage may be chosen to be a little higher than the saturation voltage of the comparator circuit 26, which is between one and four volts. As a result, a wide margin of comparison is possible, making temperature effects insignificant. Signals A and B are latched by latch 40, and signals C and D are latched by latch 42, with X and Y serving as clock signals. In other words, the write driver data $H_x$ and $H_y$ are latched just before their predetermined polarity change by using, essentially, the rising edges of $D_x$ and $D_y$ as latch clocks. It may be seen from the timing diagram in FIG. 2, that during normal operation, the latch output signals, $O_x$ and $O_y$, are always high or at logic level "one," and the circuit output from multiplexer 54 is always high. However, if an open circuit condition exists, the $H_x$ and $H_y$ waveforms become disrupted, and the signals $O_x$, $O_y$, and output become low or logic "zero."

Figure 5:
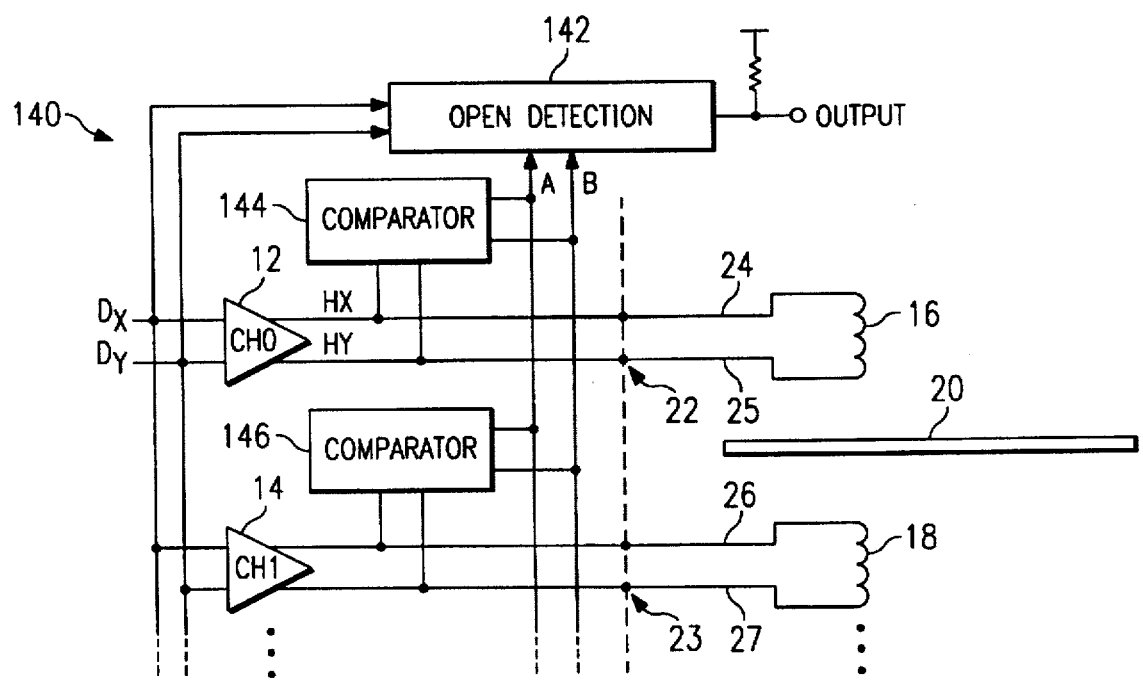
FIG. 5 is another simplified block diagram of the apparatus for detecting open circuit in a hard disk write driver.
Figure 6:
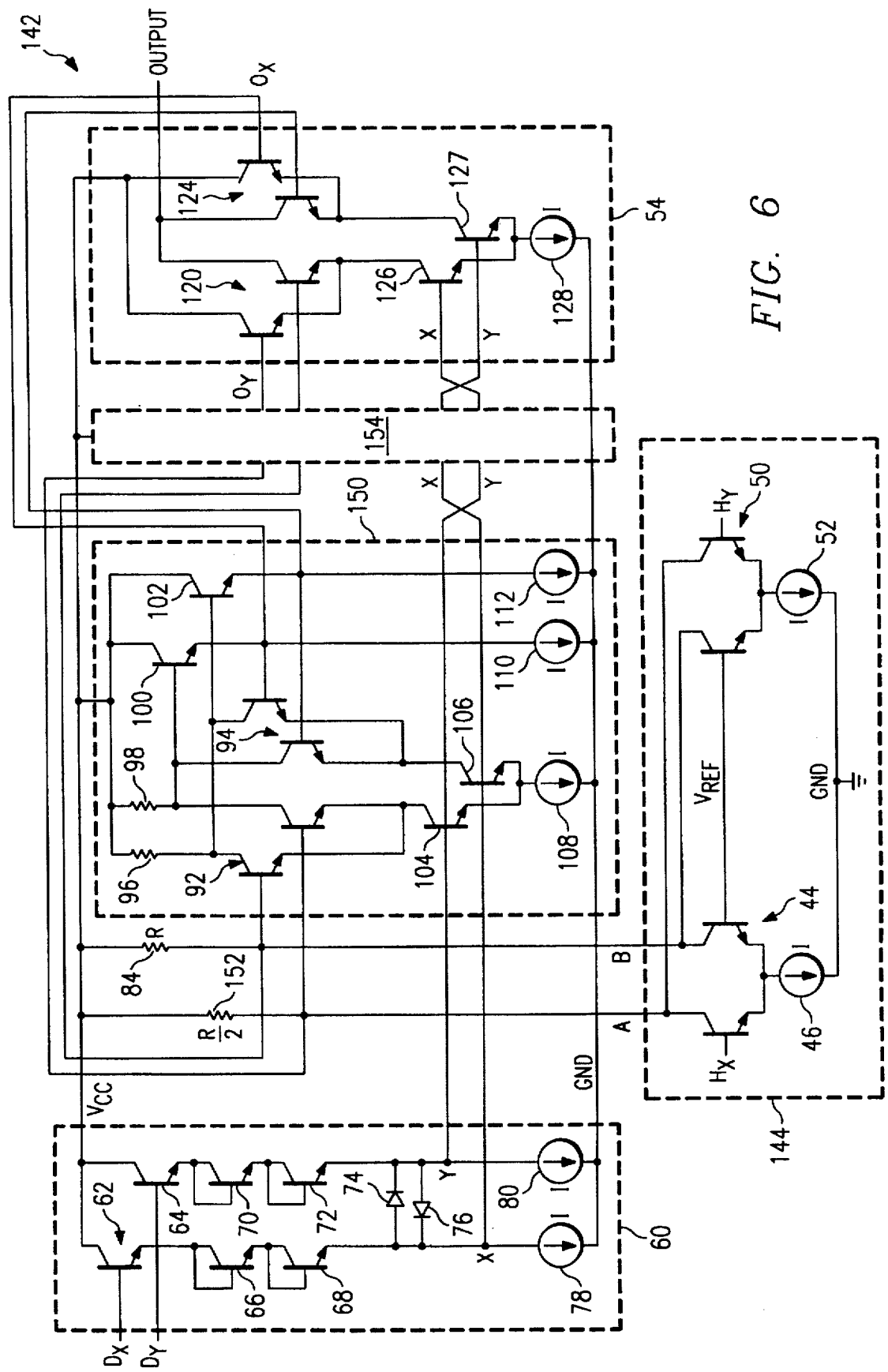
FIG. 6 is a schematic diagram of another embodiment of the open detecting latch circuit constructed in accordance with the teachings of the present invention.

Referring to both FIGS. 5 and 6, an alternate embodiment of open detection and comparator circuit 140 is shown. In comparator circuit 144 and 146, the differential output from differential pairs 44 and 50 are tied together to form one set of differential output signals, A and B. Differential signals A and B are then provided to both latches 150 and 154, which are constructed basically the same as latches 40 and 42. The differences are that the resistor value of resistor 152 coupled to receive signal A is divided by half to reduce the magnitude of the voltage at the base of one of the transistors in differential pair 92 caused by sinking twice the current by current sources 46 and 52. Resistors 114 and 116 present in FIG. 4 are also eliminated. The exemplary embodiment as shown in FIGS. 5 and 6 has the advantage of less number of connections for each channel, which is more substantial where there are multiple channels.

Although the present invention and its advantages have been described in detail, it should be understood that various changes, substitutions and alterations can be made therein without departing from the spirit and scope of the invention as defined by the appended claims.

What is claimed is:

1. An open circuit detection circuit for a hard disk drive magnetic write coil coupled to the output of a write driver, said write driver generating a write head signal in response to write data, comprising:
   a comparator coupled to the output of said write driver for comparing said write head signal to a predetermined reference level and generating a comparison output indicative of whether said write head signal is more or less than said predetermined reference level;
   a first latch coupled to said comparator, said latch being clocked by said write data for latching said comparison output just prior to a predetermined polarity change in said write head signal, said output from said latch indicative of an open circuit condition.

2. The circuit, as set forth in claim 1, wherein said write driver generates first and second write head signals from first and second write data, the circuit further comprising:
   said comparator comparing both first and second write head signals with said predetermined reference level and generating first and second differential comparison output signals in response thereto;
   said first latch latching said first differential comparison output signals being clocked by said first and second write data just prior to said predetermined polarity change in said first write head signal; and
   a second latch coupled to said comparator being clocked by said first and second write data for latching said second differential comparison output signals just prior to a predetermined polarity change in said second write head signal, said output from said second latch indicative of an open circuit condition.

3. The circuit, as set forth in claim 2, further comprising a multiplexer alternatively selecting one of said outputs from said first and second latches in response to said first and second write data.

4. The circuit, as set forth in claim 1, further comprising a conversion circuit receiving said first and second write data for converting said write data to ECL voltage levels for input to said first and second latches, said latches being ECL circuits.

5. The circuit, as set forth in claim 2, wherein said comparator comprises:
   a first differential pair receiving said first write head signal and reference level as differential input and generating said first differential comparison output signals, said first differential comparison output signals being provided to said first latch; and
   a second differential pair receiving said second write head signal and reference level as differential input and generating a second differential output, said second differential output being provided to said second latch.

6. The circuit, as set forth in claim 1, wherein said hard disk drive includes a plurality of channels and a write driver for each channel, the circuit further comprises a comparator for each channel.

7. The circuit, as set forth in claim 2, wherein said hard disk drive includes a plurality of channels and a write driver for each channel, the circuit further comprises a comparator for each channel.

8. A circuit for detecting an open circuit condition in an external write magnetic coil in a hard disk drive, said magnetic coil receiving write head signals $H_x$ and $H_y$ generated by a write driver in response to write data $D_x$ and $D_y$, comprising:
   a comparator coupled to said write driver comparing both said write head signals $H_x$ and $H_y$ with a predetermined reference voltage level and generating first and second differential comparison output signals in response to said comparisons;
   a first latch coupled to said comparator being clocked by said write data $D_x$ and $D_y$ for latching said first differential comparison output signal just prior to a predetermined polarity change in said write head signal $H_x$;
   a second latch coupled to said comparator being clocked by said write data $D_x$ and $D_y$ for latching said second differential comparison output signal just prior to a predetermined polarity change in said write head signal $H_y$; and
   a multiplexer coupled to said first and second latches for alternatively selecting an output from one of said first and second latches in response to said write data $D_x$ and $D_y$, said multiplexer generating an output indicative of an open circuit condition in said external write magnetic coil.

9. The circuit, as set forth in claim 8, further comprising a conversion circuit receiving said write data $D_x$ and $D_y$ for converting said write data to ECL voltage levels for input to said first and second latches, said latches and said multiplexer being ECL circuits.

10. The circuit, as set forth in claim 8, wherein said hard disk drive includes a plurality of channels and a write driver for each channel, the circuit further comprises a comparator for each channel.

11. A method for detecting an open circuit condition in an external write magnetic coil of a hard disk drive, said hard disk drive having a write driver per channel receiving write data $D_x$ and $D_y$ and generating write head signals $H_x$ and $H_y$ to said coil, comprising the steps of:

comparing said write head signals $H_X$ and $H_Y$ with a predetermined reference voltage level and generating a first and second comparison output;

capturing a logic state of said first comparison output just prior to a predetermined polarity change in said $H_X$ write head signal;

capturing a logic state of said second comparison output just prior to a predetermined polarity change in said $H_Y$ write head signal; and generating an output signal indicative of an open circuit condition from said captured logic states of said first and second comparison outputs.

12. The method, as set forth in claim 11, wherein said output signal generating step includes the step of alternatively selecting one of said first and second comparison output captured logic states depending on the logic values of said write data $D_X$ and $D_Y$.

13. The method, as set forth in claim 11, wherein said output signal generating step includes the step of alternatively selecting one of said first and second comparison output captured logic states depending on an active transitioning edge of said write data $D_X$ and $D_Y$.

* * * * *